US 9,004,998 B2

(12) United States Patent
Coulson (10) Patent No.: US 9,004,998 B2
(45) Date of Patent: Apr. 14, 2015

(54) SOCIAL INTERACTION DURING ONLINE GAMING

(75) Inventor: John Lawrence Coulson, Pender Island (CA)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 13/696,062

(22) PCT Filed: Jun. 20, 2011

(86) PCT No.: PCT/US2011/041113
§ 371 (c)(1),
(2), (4) Date: Nov. 2, 2012

(87) PCT Pub. No.: WO2012/177236
PCT Pub. Date: Dec. 27, 2012

(65) Prior Publication Data
US 2013/0190062 A1    Jul. 25, 2013

(51) Int. Cl.
*G06F 17/00* (2006.01)
*A63F 13/20* (2014.01)
*A63F 13/00* (2014.01)
*A63F 13/40* (2014.01)

(52) U.S. Cl.
CPC ......... *A63F 13/00* (2013.01); *A63F 2300/1087* (2013.01); *A63F 13/06* (2013.01); *A63F 2300/69* (2013.01); *A63F 2300/8017* (2013.01); *A63F 13/10* (2013.01)

(58) Field of Classification Search
USPC .............................. 463/7, 8, 23, 32
See application file for complete search history.

(56) References Cited

U.S. PATENT DOCUMENTS

| 5,462,275 | A | 10/1995 | Lowe et al. |
| 5,860,862 | A | 1/1999 | Junkin |
| 5,890,963 | A | 4/1999 | Yen |
| 6,283,757 | B1 * | 9/2001 | Meghnot et al. ................ 434/33 |
| 6,394,895 | B1 | 5/2002 | Mino |
| 6,632,138 | B1 | 10/2003 | Serizawa et al. |
| 6,669,565 | B2 * | 12/2003 | Liegey ............................. 463/42 |
| 6,726,567 | B1 | 4/2004 | Khosla |

(Continued)

FOREIGN PATENT DOCUMENTS

| JP | H08293810 A | 11/1996 |
| JP | 2000308757 A | 11/2000 |

(Continued)

OTHER PUBLICATIONS 3-axis mems Search Results on Wikipedia [last accessed Oct. 25, 2012].

(Continued)

*Primary Examiner* — Ronald Laneau
(74) *Attorney, Agent, or Firm* — Brundidge & Stanger, P.C.

(57) ABSTRACT

Technology is described for enabling social interaction during online gaming. In some examples, the technology can include receiving from a remote device a movement signal indicating an actual movement of a human sports player during a real sporting event in which the human sports player is participating; receiving from a local control device a control signal from a user, wherein the control signal indicates input to a simulation; comparing the received movement signal with the received control signal; computing based on the comparison a score to award to the user; and awarding the computed score to the user.

21 Claims, 8 Drawing Sheets

(56) References Cited

U.S. PATENT DOCUMENTS

| | | | |
|---|---|---|---|
| 7,005,970 | B2 | 2/2006 | Hodsdon et al. |
| 7,351,150 | B2 | 4/2008 | Sanchez |
| 7,657,920 | B2 | 2/2010 | Arseneau et al. |
| 7,728,920 | B2 | 6/2010 | Liang |
| 7,828,655 | B2 | 11/2010 | Uhlir et al. |
| 8,388,445 | B2 * | 3/2013 | Pavlich et al. ............... 463/42 |
| 2005/0202905 | A1 | 9/2005 | Chesser |
| 2006/0258462 | A1 | 11/2006 | Cheng et al. |
| 2008/0242417 | A1 | 10/2008 | Schueller |
| 2008/0280685 | A1 | 11/2008 | Hansen et al. |
| 2008/0312010 | A1 | 12/2008 | Marty et al. |
| 2009/0029754 | A1 | 1/2009 | Slocum et al. |
| 2009/0082879 | A1 | 3/2009 | Dooley et al. |
| 2009/0325686 | A1 * | 12/2009 | Davis et al. ............... 463/25 |
| 2010/0026809 | A1 | 2/2010 | Curry |
| 2010/0029352 | A1 | 2/2010 | Angelopoulos |
| 2011/0039624 | A1 | 2/2011 | Potkonjak |

FOREIGN PATENT DOCUMENTS

| | | | |
|---|---|---|---|
| JP | 2001347074 | A | 12/2001 |
| JP | 2003175278 | A | 6/2003 |
| JP | 2003241642 | A | 8/2003 |
| JP | 2005218757 | A | 8/2005 |
| JP | 2005316466 | A | 11/2005 |
| JP | 2008173138 | A | 7/2008 |
| JP | 2008241476 | A | 10/2008 |
| JP | 2013501575 | A | 1/2013 |
| KR | 1020040041297 | A | 5/2004 |
| WO | 2011022108 | A1 | 2/2011 |

OTHER PUBLICATIONS

Best Hand Held Game Systems, Top Picks and Reviews at ConsumerSearch, http://www.consumersearch.com/hand-held-games [last accessed Oct. 25, 2012].
Broadcast Sports Incorporated, http://www.broadcastsportsinc.com/ [last accessed Oct. 25, 2012].
Cho, Nic, "I-Play Announces New Fast & Furious Mobile Game," Mar. 24, 2009, My Digital Life © 2005-2012.
DTM Racing Live Online, posted May 19, 2008, © 2011 Live Racing Online.
Fun Car Games for Racing Fans, Auto-Facts.org, © 2006-2012 Mark Gittelman LLC, http://www.auto-facts.org/fun-car-games.html [last accessed Oct. 25, 2012].
hand held game systems Google Search [last accessed Oct. 25, 2012].
Interesting Statistics of Online Game Market, MMORPG News, Apr. 21, 2010, 2005-2012 MMOsite.com.
International Search Report and Written Opinion for PCT International Application No. PCT/US2011/041113 filed Jun. 20, 2011, mailing date: Nov. 16, 2011, 9 pages.
iRacing.com, The Premier Online Sim Racing Game, © 2012 iRacing.com Motorsport Simulations LLC, http://www.iracing.com/ [last accessed Oct. 25, 2012].
List of video game developers From Wikipedia, 26 pages, http://en.wikipedia.org/wiki/List_of_video_game_developers [last accessed Oct. 25, 2012].
live online racing—Google Search [last accessed Oct. 25, 2012].
Massively multiplayer online game—Wikipedia, http://en.wikipedia.org/wiki/Massively_multiplayer_online_game [last accessed Oct. 25, 2012].
Olausson, Martin, "Online Game Revenue Fuels Global Video Game Software Market," Feb. 19, 2010, Strategy Analytics © 2012.
online auto racing Google Search [last accessed Oct. 25, 2012].
Online video game market estimate at—Google Search [last accessed Oct. 25, 2012].
Race2Play Multiplayer Online Racing, http://www.race2play.com/front/second_front [last accessed Oct. 25, 2012].
Scheve, Tom, "How NASCAR Broadcasts Work," http://auto.howstuffworks.com/auto-racing/nascar/jobs/nascar-broadcast.htm [last accessed Oct. 25, 2012].
Sim racing—Wikipedia, http://en.wikipedia.org/wiki/Sim_racing [last accessed Oct. 25, 2012].
SY Tan, "Race in Real-Time and Online Auto Racing Game," Aug. 27, 2008, My Digital Life © 2005-2012.
Algorithm 3-axis mems Google Search, 2 pages [last accessed Nov. 2, 2012].
Algorithm 3-axis mems wii Google Search, 2 pages [last accessed Nov. 2, 2012].
Motion s face Google Search, 2 pages [last accessed Nov. 2, 2012].
3ds Google Search, 2 pages [last accessed Nov. 2, 2012].
Nascar 2011 the game Google Search, 2 pages [last accessed Nov. 2, 2012].
Rockstar Games, 2 pages, http://www.rockstargames.com/ [last accessed Nov. 2, 2012].
"Artificial Contender™ Overview," Accessed at http://trusoft.com/ac_overview.html, Accessed on Sep. 25, 2014, pp. 2.
"FIFA (video game series)," Accessed at http://web.archive.org/web/20100615193908/http://en.wikipedia.org/wiki/FIFA_(video_game_series), last modified on Jun. 11, 2010, pp. 10.
"FIFA Soccer: FIFA 2012—EA Games | EA Sports Soccer," Accessed at http://web.archive.org/web/20110609015207/http://www.ea.com/soccer/fifa, Accessed on Sep. 25, 2014, pp. 2.
"Showcase: Artificial Contender™ in the development of SONY's This Is Football," Accessed at http://trusoft.com/showcase.html, Accessed on Sep. 25, 2014, p. 1.
"Why is StarCraft Popular in Korea?," Accessed at http://askakorean.blogspot.co.il/2010/02/why-is-starcraft-popular-in-korea.html, posted on Feb. 19, 2010, pp. 25.
Bell, C., "Video games: the sport of the future?," Accessed at http://www.telegraph.co.uk/technology/video-games/10132883/Video-games-the-sport-of-the-future.html, posted on Jun. 26, 2013, pp. 7.
Champandard, A. J., "Behavior Capture and Learning Football by Imitation," Accessed at http://web.archive.org/web/20140904232302/http://aigamedev.com/open/review/learning-football-imitation/, Posted on May 21, 2009, pp. 8.
International Search Report and Written Opinion in related International Patent Application No. PCT/US2011/040343 mailed Oct. 24, 2011.
Pavlacka, A., "NCAA Football 2004 (Xbox)," Accessed at http://web.archive.org/web/20080511193017/http://xbox.gamespy.com/xbox/ncaa-football-2004/6035p1.html, posted on Jul. 26, 2003, pp. 3.
Pleština, V. et al., "A modular system for tracking players in sports games," International Journal of Education and Information Technologies, vol. 3, No. 4 (2009).
Seo, Y. et al., "Where are the ball and players? Soccer game analysis with color-based tracking and image mosaic," Image Analysis and Processing Lecture Notes in Computer Science, vol. 1311, pp. 196-203 (1997).

* cited by examiner

SOCIAL INTERACTION DURING ONLINE GAMING

CROSS-REFERENCE TO RELATED APPLICATION

This application is a U.S. National Stage application filing under 35 U.S.C. §371 of International Application No. PCT/US2011/041113, filed on Jun. 20, 2011, entitled "SOCIAL INTERACTION DURING ONLINE GAMING," which is incorporated herein by reference in its entirety.

BACKGROUND

People use simulators to simulate various real activities. As an example, people play video games that simulate real sports with real sports players. Video game players can use video game consoles to play various video games, e.g., sports video games. Some of these sports video games have even been endorsed by professional sports leagues, and can simulate real sports players and real sports teams that play real sports.

For many people, watching sports in real contexts (e.g., live or broadcast sports) is a very passionate activity. So much so, that people will set aside an entire afternoon, an entire day, or even several days to watch their favorite sports teams or sports players play individual and team sports. In the United States, the expression "Monday morning quarterbacking" is often used to describe behavior by sports fans who criticize or pass judgment over sports players, managers, and others with the benefit of hindsight. Sports fans in other countries can be equally passionate about what their favorite sports player or sports team could have done better to secure a better score or a win.

Many people also enjoy competition. They dream about competing head-to-head with sports players or against others who are similarly passionate. Others dream of being a pilot, astronaut, global explorer, etc.

SUMMARY

Technology is described for enabling social interaction while participating in online gaming. In various embodiments, the technology includes receiving from a remote device a movement signal indicating an actual movement of a human sports player during a real sporting event in which the human sports player is participating; receiving from a local control device a control signal from a user, wherein the control signal indicates input to a simulation; comparing the received movement signal with the received control signal; computing based on the comparison a score to award to the user; and awarding the computed score to the user.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Technology is disclosed for enabling social interaction while participating in online gaming ("the technology"). In various embodiments, the technology enables a user (e.g., a video game player or passive user) to be virtually placed in the milieu of a real event, e.g., a real sporting event. The technology can enable users, e.g., video game players who are playing multiplayer video games, to interact with other users and even real sports players (also "sports players") participating in the real sporting event. Thus, the technology enables video game players to pit their "avatars" against real sports players in the real sports players' sports. In various embodiments, the technology can enable one or more video game players to participate using a video game console, e.g., by viewing output on a television or projection screen and providing input via a video game controller. The technology may compare input provided by a video game player to inputs measured or observed of a real sports player, and compute a score based on the comparison. The technology may then award points based on how close the video game player's inputs are to the real sports player's inputs. The technology can also enable the video game player to observe what the real sports player observes, e.g., by viewing signals from one or more image capture devices (e.g., cameras, video cameras, three-dimensional cameras) situated near the real sports player. As an example, the technology may be used in car racing. In this example, one or more sensors may sense inputs of a race car driver (who is the real sports player in this example), e.g., steering wheel inputs, brake inputs, accelerator inputs, gear changer inputs, etc.; and compare a video game player's inputs at a video game controller.

The technology may simulate various aspects of the real sports player's physical experience, e.g., so that the video game player can also view and indeed feel almost everything the race car driver does. The simulation may include one or more projection screens, video monitors, three-dimensional displays, vibration devices, and/or other output devices. The technology may select various devices near the real sports player from which to receive inputs for the simulation, e.g., cameras, vibration detectors, motion sensors, microelectromechanical systems (MEMS), global positioning systems, etc.

In various embodiments, a video game player may sign up to play online. The video game player may select a set of real sports players to be measured against. As an example, the video game player may select two sports players. If inputs from a first of the sports players can no longer be received (e.g., because of a communications failure or the first sports player is no longer competing), the technology may select a second (e.g., backup) sports player. The technology may also adjust the accumulated points or scores if the second player is selected, e.g., to account for differences in performance of the two sports players.

The technology may also adjust the accumulated points or scores based on inputs. As an example, if the video game player's inputs are nearly identical to the selected sports player's inputs, additional points may be awarded. The more disparity there is between the video game players inputs and the real sports player's inputs, fewer points are awarded. If the video game player makes a move that would lead to a negative outcome (e.g., a car crash or spinout), points may be deducted.

During the sporting event, the technology can collect and broadcast inputs from real sports players in nearly real time. As an example, a device proximate to the real sports player can collect inputs, e.g., from various sensors, cameras, etc., and broadcast the collected inputs to the simulators employed by the video game players. The simulators, in turn, may compare the inputs of the video game players to the broadcast inputs, and provide this information to a server for computation of scores, comparison of the scores with scores for other players, awarding prizes based on the scores, etc.

In various embodiments, the technology may enable players using various computing devices (e.g., full motion simulators, personal computing devices, tablet computing devices, handheld computing devices, etc.) to participate, and may adjust scores to account for the different devices. As an example, a video game player using a handheld computing device may be disadvantaged by not being able to fully view camera inputs because that player cannot anticipate upcoming changes in road conditions or course layouts as well as a player using a full motion simulator and projection system.

In various embodiments, spectators viewing the sporting event—whether live or remotely—may also employ aspects of the technology without playing a video game. As an example, spectators may select various camera angles, receive vibration simulations, etc. They may employ some aspects even while seated as a spectator at a live event.

Figure 1:
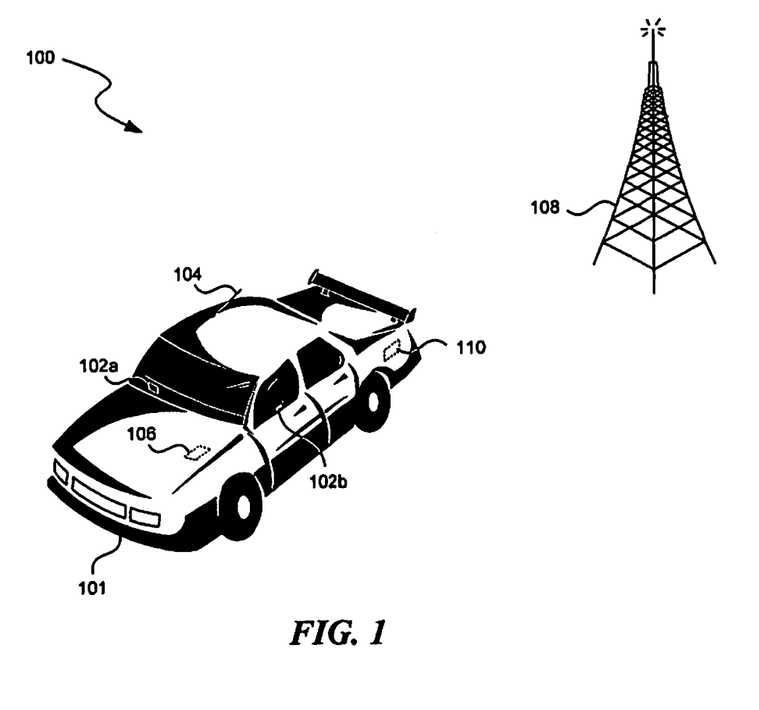
FIG. 1 is an environmental diagram illustrating an environment in which the technology may operate in some embodiments.

Turning now to the figures, FIG. 1 is an environmental diagram illustrating an environment 100 in which the technology may operate in some embodiments. The environment 100 can include a sports apparatus, e.g., a sports car 101. The sports apparatus can be an apparatus that a sports player may use during a sporting event. Other examples of sports apparatuses are bats, balls, rackets, clubs, or indeed any sports paraphernalia. The sports car 101 can include a front camera 102a and a side camera 102b that can approximate what the real sports player (e.g., a race car driver) views. Other cameras (e.g., rear facing, etc.) may also be employed. The sports car 101 may also include an antenna 104, e.g., to communicate information from the sports car 101 to a user's video game console (not illustrated), e.g., via an antenna 108. The sports car 101 may include sensors, e.g., sensors 106 and 110 to observe the sports player's movements, the sports apparatus's movements, proximity to other devices or equipment, etc. These movements and other information can be communicated to the user's video game console.

Figure 2:
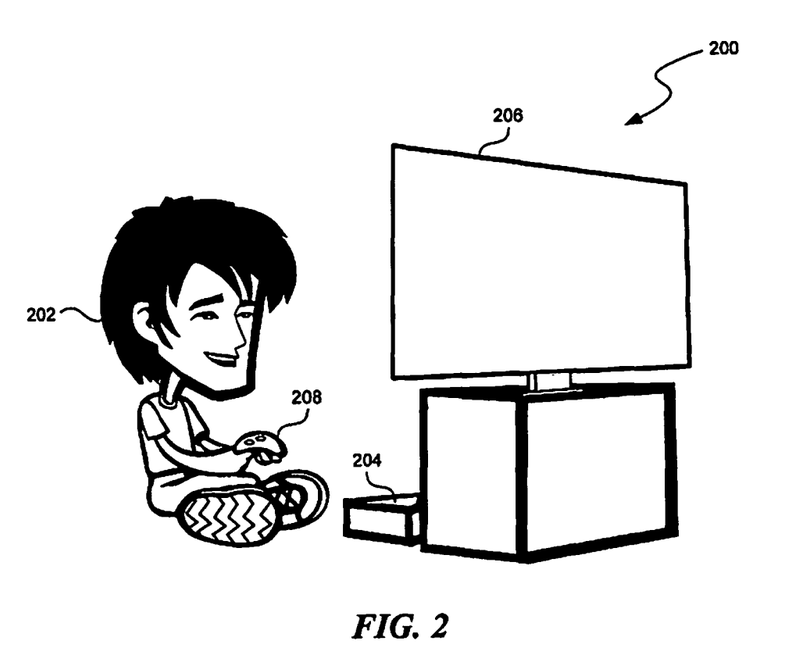
FIG. 2 is an environmental diagram illustrating an environment in which the technology may operate in some embodiments.

FIG. 2 is an environmental diagram illustrating an environment 200 in which the technology may operate in some embodiments. The environment 200 can include a console or set-top box 204 (e.g., a video game console), display device 206 (e.g., a projector, monitor, television, etc.) and a controller 208 (e.g., a video game controller). A user 202 (e.g., a video game player) may operate the video game controller 208 to interact with a simulation, e.g., a video game that is simulated by the console 204. The user 202 can provide input to the simulation via the controller 208, a microphone (not illustrated), or by using other input devices. Output from the simulation can be visually indicated in the display 206, provided via a tactile response on the controller 208, and/or provided aurally using speakers (not shown). In various embodiments, various types of input and output can be employed. As an example, the user 202 may occupy a specially designed seat or other enclosure (not illustrated) that provides various types of simulated feedback. In various embodiments, various input and output devices may be employed. These can include keyboards, joysticks, mouse, handheld or other game controllers, balls, etc. The input devices may be general purpose or specific to a particular sport.

In various embodiments, the user 202 may employ a full motion simulator, surround screen (e.g., a panoramic display), etc. As an example, the full motion simulator may be in the shape of a race car.

Figure 3:
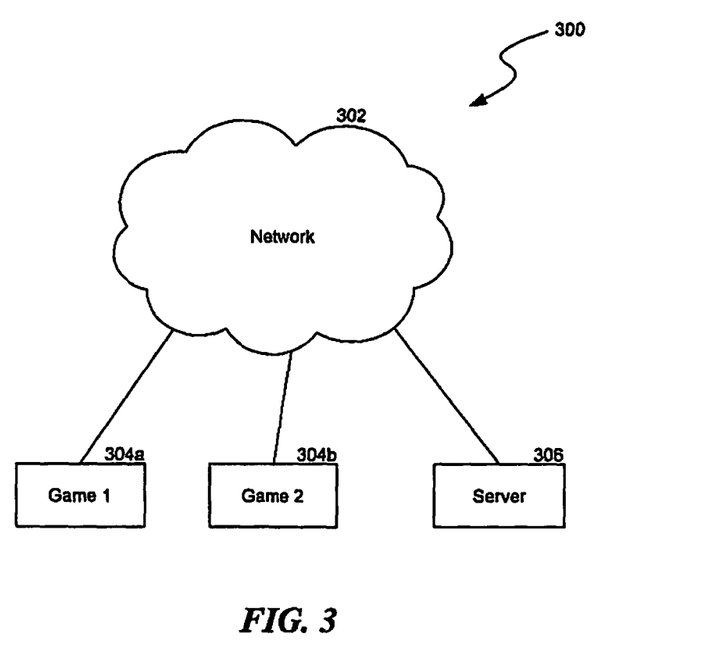
FIG. 3 is a block diagram illustrating components employed by the technology in various embodiments.

FIG. 3 is a block diagram illustrating components 300 employed by the technology in various embodiments. The components 300 can include a network 302, e.g., the Internet or an intranet, that enables one or more computing devices, e.g., a first game console 304a, a second game console 304b, and a server 306, to exchange communications with one another. As an example, the game consoles 304a and 304b may receive communications from the server 306 to indicate information collected from sensors proximate to a sports player.

Figure 4:
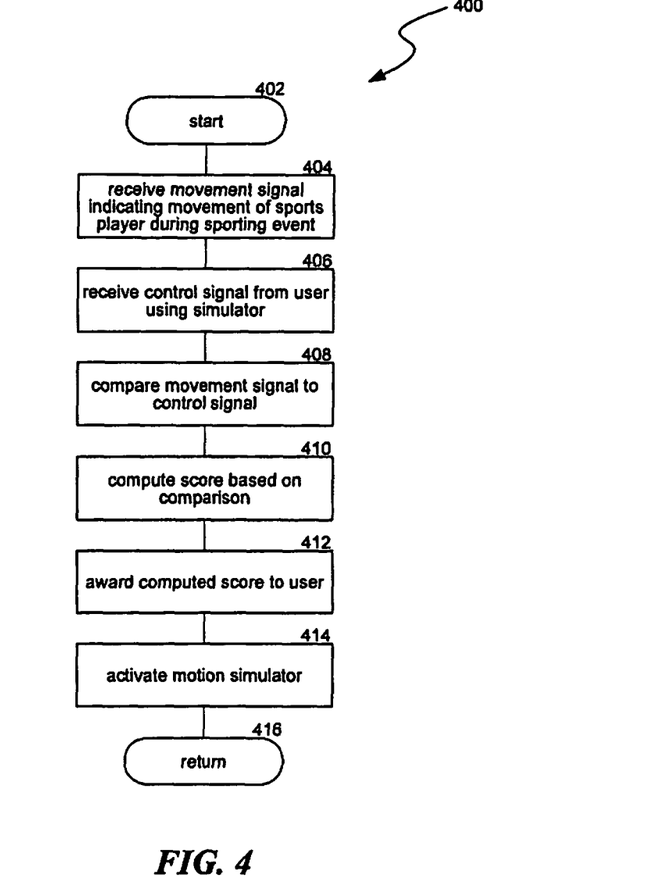
FIG. 4 is a flow diagram illustrating a routine that the technology may invoke in various embodiments, e.g., to compute scores based on a comparison between a video game player's movements and a sports player's movements.

FIG. 4 is a flow diagram illustrating a routine 400 that the technology may invoke in various embodiments, e.g., to compute scores based on a comparison between a video game player's movements (e.g., inputs) and a sports player's movements (e.g., inputs). The routine 400 begins at block 402. The routine then continues at block 404, where it receives a movement signal indicating movement of a sports player during a sporting event. As an example, the routine may receive input from various sensors proximate to the sports player, e.g., MEMS sensors, that are broadcast to video game consoles. The routine then continues at block 406, where it receives a control signal from a user using a simulator, e.g., executing at a video game console. As an example, the routine may receive inputs from a game controller that the user employs. The routine then continues at block 408, where it compares the received movement signal to the received control signal. The routine then continues at block 410, where it computes a score based on the comparison. The routine then continues at block 412, where it awards the computed score to the user. The routine then continues at block 414, where it activates a motion simulator. The routine then continues at block 416, where it returns.

Those skilled in the art will appreciate that the logic illustrated in FIG. 4 and described above, and in each of the flow diagrams discussed below, may be altered in a variety of ways. For example, the order of the logic may be rearranged, sublogic may be performed in parallel, illustrated logic may be omitted, other logic may be included, etc. In various embodiments, portions of the routine may be executed by a server computing device, a client computing device, or other computing devices.

Figure 5:
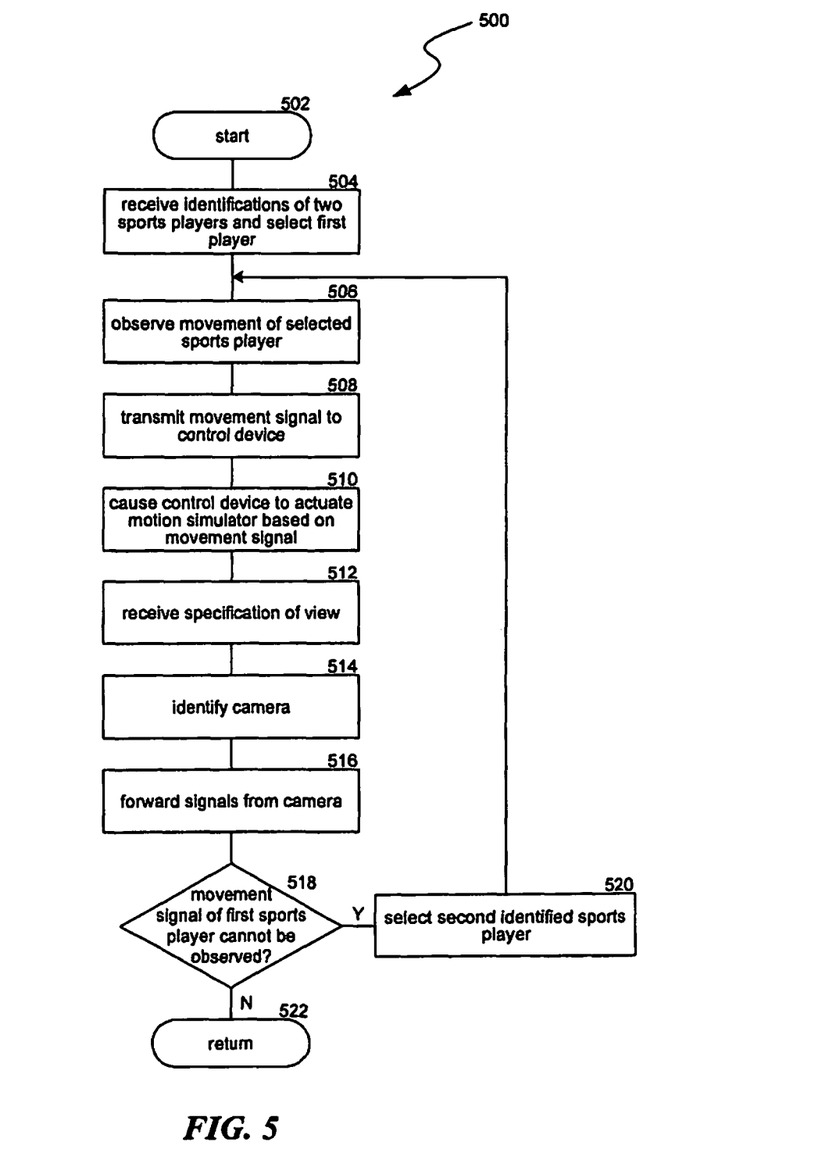
FIG. 5 is a flow diagram illustrating a routine that the technology may invoke in various embodiments, e.g., to enable a video game player to view what a sports player can view.

FIG. 5 is a flow diagram illustrating a routine 500 that the technology may invoke in various embodiments, e.g., to enable a video game player to experience (e.g., view, hear, feel, etc.) what a sports player does and/or experiences. The routine begins at block 502. The routine then continues at block 504, where it receives identifications of two sports players and a selection of a first sports player. In various embodiments, the technology can enable a user to specify one, two, or more sports players. The routine then continues at block 506, where it observes movement (e.g., inputs) of the selected sports player. The routine then continues at block 508, where it transmits the observed movement signals to a control device proximate to the user. As an example, a race car may include a component that collects and broadcasts input received from MEMS sensors, steering wheel, brake, accelerator, GPS, etc. As another example, a soccer game may include sensors along fields and goalposts, and a transmitter or radiofrequency identification chip embedded in a soccer ball. In some embodiments, the technology can be particularly suited to activities that require the user to be almost static, e.g., sitting, standing, moving side to side, moving back and forth, etc., in a limited area. As an example, in baseball, the user stands at home plate in the living room and can swing away; when a hit occurs the end user is not required to run the bases. In this way the baseball batter application provides a game scenario and training tool. Using the technology from a pitcher's viewpoint, a user can throw a simulated baseball in the living room at a real live batter which could teach ball control and other pitching nuances as the user would have to anticipate the pitch the real pitcher is about to throw. The routine then continues at block 510, where it causes the control device to actuate a motion simulator based on the transmitted movement signal. As an example, a full motion simulator employed by a user may simulate motions, sounds, sights, etc. The routine then continues at block 512, where it receives a specification of a view. As an example, the routine may receive an indication of a forward view, a reverse view, a side view, etc. The routine then continues at block 514, where it identifies a camera that is capable of providing the specified view. The routine then continues at block 516, where it forwards signals from the identified camera, e.g., to the game console that the user is using. The routine then continues at decision block 518, where it determines whether the movement signal for the first sports player can no longer be observed. As an example, if the sports player's communications devices become dysfunctional or if the sports player's car has crashed, that sports player's movement signals may no longer be received. If that is the case, the routine continues at block 520. Otherwise, the routine continues at block 522, where it returns. At block 520, the routine selects the second identified sports player. The routine then loops to block 506.

Figure 6:
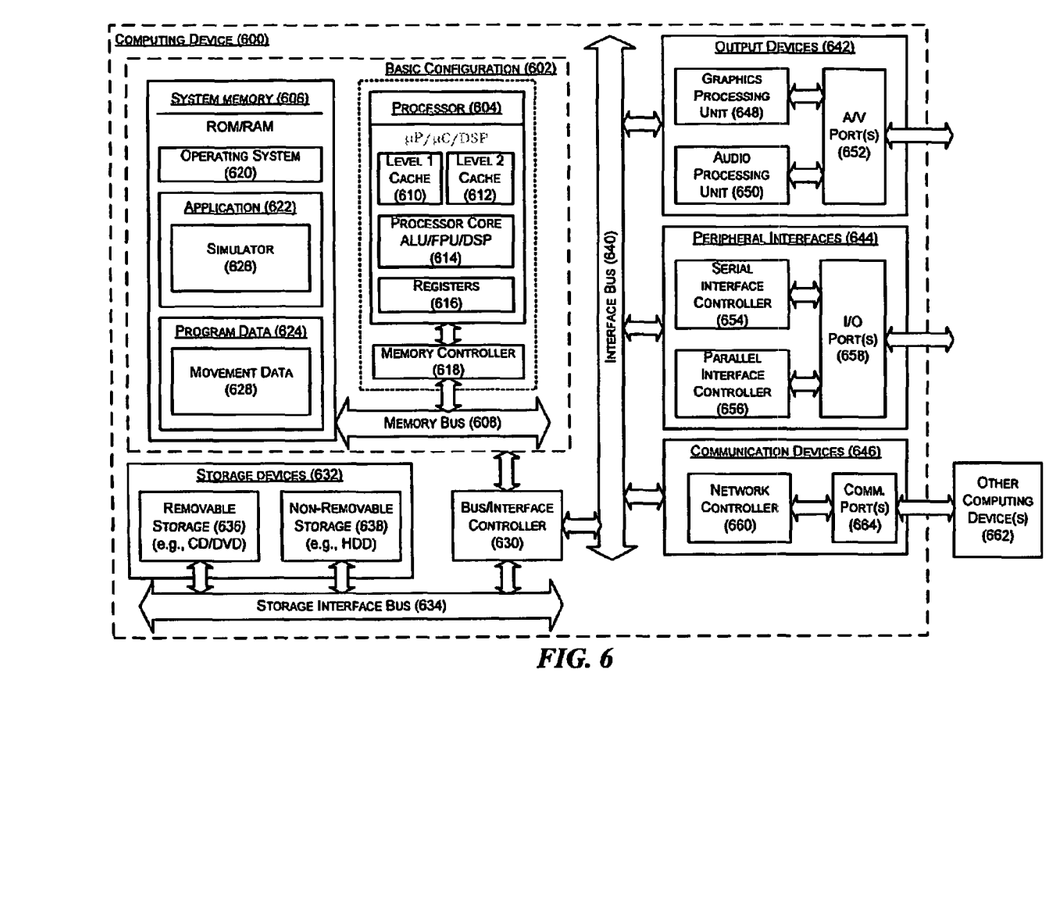
FIG. 6 is a block diagram of an illustrative embodiment of a computing device that is arranged in accordance with at least some embodiments of the present disclosure.

FIG. 6 is a block diagram illustrating an example computing device 600 that is arranged in accordance with at least some embodiments of the present disclosure. In a very basic configuration 602, computing device 600 typically includes one or more processors 604 and a system memory 606. A memory bus 608 may be used for communicating between processor 604 and system memory 606.

Depending on the desired configuration, processor 604 may be of any type including but not limited to a microprocessor (µP), a microcontroller (µC), a digital signal processor (DSP), or any combination thereof. Processor 604 may include one more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with processor 604, or in some implementations memory controller 618 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622, and program data 624. Application 622 may include a simulator component 626 that is arranged to compress data using one or more compression methods. Program data 624 may include movement data 628 (e.g., input data), as is described herein. In some embodiments, application 622 may be arranged to operate with program data 624 on operating system 620 such that rotation of displayed information is enabled or disabled, e.g., depending on an orientation of the display. This described basic configuration 602 is illustrated in FIG. 6 by those components within the inner dashed line.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more AN ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations.

Figure 7:
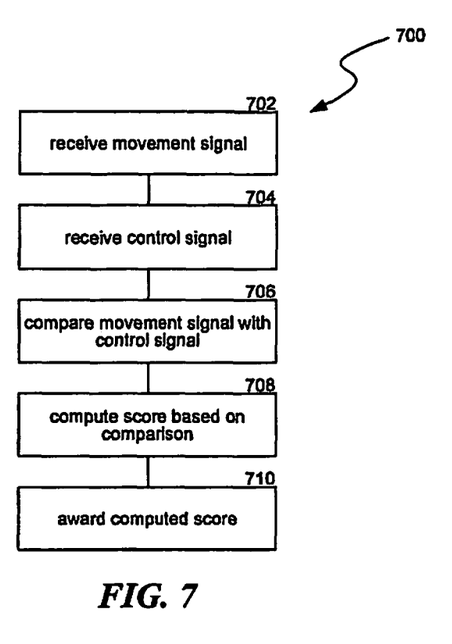
FIG. 7 is a flow diagram illustrating a routine the technology may invoke in various embodiments.

FIG. 7 is a flow diagram illustrating a routine the technology may invoke in various embodiments. In various embodiments, the technology performs a method 700 comprising: receiving 702 from a remote device a movement signal indicating an actual movement of a human sports player during a real sporting event in which the human sports player is participating; receiving 704 from a local control device a control signal from a user, wherein the control signal indicates input to a simulation; comparing 706 the received movement signal with the received control signal; computing 708 based on the comparison a score to award to the user, and awarding 710 the computed score to the user. The method can further comprise comparing the awarded score to a set of scores awarded to other users. The method can further comprise receiving an indication to provide a view in a specified direction; transmitting an indication of the specified direction; and receiving a video sequence wherein the video sequence is representative of a view in the specified direction in relation to the human sports player. The video sequence may be received from one of multiple remote video cameras located proximate or affixed to the sports player. The technology may receive, record, and/or playback various sounds, e.g., ambient noise, speech, sounds, etc. The method can further comprise receiving movement signals in three dimensions. The method can further comprise receiving control signals in at least two dimensions. The method can further comprise simulating via a motion simulator movement based on the received control signals. The method can further comprise simulating via a motion simulator movement based on the received movement signal. The method can further comprise displaying on one or more panoramic images proximate to the user a view observed by one or more cameras proximate to the sports player.

In various embodiments, the technology includes a system, comprising: a remote system, proximate to a human sports player participating in a real sporting event, configured to observe inputs provided by a human sports player indicative of a desired movement, and/or actual movements of the human sports player to receive signals from one or more cameras; to transmit indications of the observations as movement signals; and to transmit a video sequence based on the signals received from at least one of the cameras; and a local system, proximate to a user participating in a simulation of the real sporting event, configured to receive inputs from the user; compare the inputs received from the user with received movement signals; and compute based on the comparison a score to award to the user. The system can further comprise a component configured to award the computed score to the user, an electronic game; and/or one or more microelectromechanical systems (MEMS) sensors to observe movement of the human sports player in multiple directions, wherein each MEMS sensor is configured to detect movement and/or rotation in one or more axes. The remote system can comprise a global positioning system antenna. The remote system can comprise a radio frequency identification unit. The local system can comprise a motion simulator and/or one or more panoramic displays.

Figure 8:
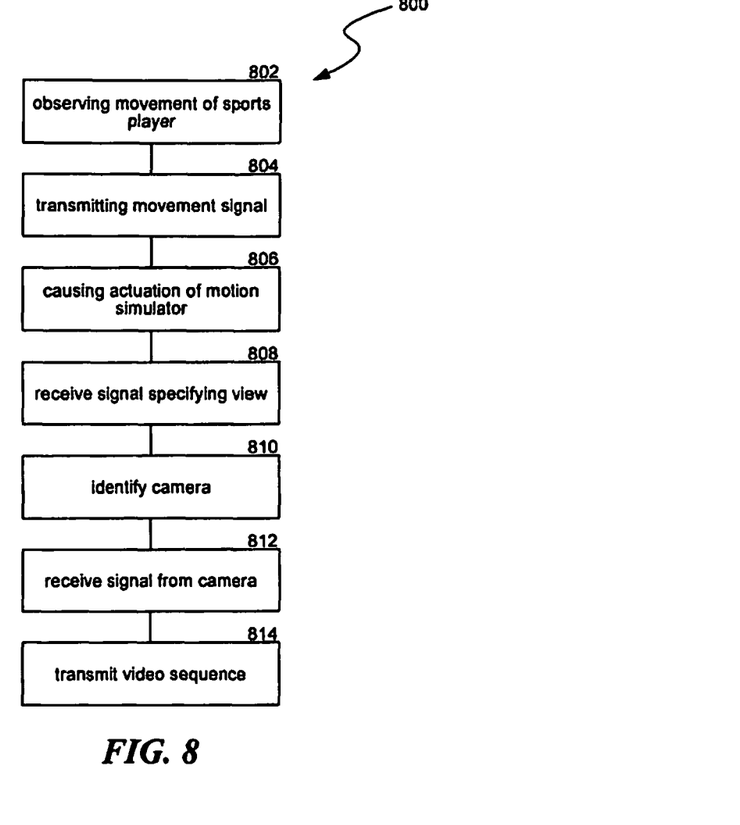
FIG. 8 is a flow diagram illustrating a routine the technology may invoke in various embodiments.

FIG. 8 is a flow diagram illustrating a routine the technology may invoke in various embodiments. In various embodiments, the technology includes one or more computer-readable storage devices storing instructions, the instructions comprising: observing 802 movement of a first human sports player during a real sporting event in which the first human sports player is participating; transmitting 804 to a control device remote from the real sporting event a movement signal indicating the observed movement; and causing 806 the control device to actuate a motion simulator based on the movement signal. The instructions can further comprise: receiving 808 from the control device a signal specifying a view; identifying 810 a camera for the specified view; receiving 812 a signal from the identified camera; and transmitting 814 a video sequence to the control device based on the received signal from the identified camera. The instructions can further comprise: receiving identifications of two or more sports players; if movement of the first human sports player cannot be observed during the real sporting event, selecting a second human sports player during the real sporting event; ceasing transmission of movement signals indicating observed movements of the first human sports player; and automatically starting transmission of movement signals indicating observed movements of the second human sports player.

In various embodiments, the technology includes one or more digital audio sound recording and playback mechanisms enabling the end user to receive live interactive sounds from the ambient environment presently occupied by the sports player, e.g., a race car, its driver and the drivers spotter; a jet airplane engine, its pilot and an air traffic controller; a space shuttle, its astronauts and mission control officials.

From the foregoing, it will be appreciated that various embodiments of the present disclosure have been described herein for purposes of illustration, and that various modifications may be made without departing from the scope of the present disclosure. Accordingly, the various embodiments disclosed herein are not intended to be limiting, with the true scope being indicated by the following claims.

I claim:

1. A method performed by a computing system having a processor and memory, comprising:
receiving from a remote device a movement signal indicating an actual movement of a human sports player during a real sporting event in which the human sports player is participating;

receiving from a local control device a control signal from a user, wherein the control signal indicates input to a full motion simulator;
comparing the received movement signal with the received control signal;
actuating the full motion simulator based on the received movement signal;
computing based on the comparison a score to award to the user; and
awarding the computed score to the user.

2. The method of claim 1 further comprising comparing the awarded score to a set of scores awarded to other users.

3. The method of claim 1 further comprising: receiving an indication to provide a view in a specified direction; transmitting an indication of the specified direction; and
receiving a video sequence wherein the video sequence is representative of a view in the specified direction in relation to the human sports player.

4. The method of claim 3, wherein the video sequence is received from one of multiple remote video cameras located proximate to the sports player.

5. The method of claim 1 further comprising receiving movement signals in three dimensions.

6. The method of claim 5 further comprising receiving control signals in at least two dimensions.

7. The method of claim 1 further comprising displaying on one or more panoramic images proximate to the user a view observed by one or more cameras proximate to the sports player.

8. The method of claim 1 wherein the full motion simulator comprises a seat configured to provide simulated feedback.

9. The method of claim 1 wherein the full motion simulator comprises an enclosure configured to provide simulated feedback.

10. A system, comprising:
a remote system, proximate to a human sports player participating in a real sporting event, configured to observe inputs provided by the human sports player indicative of a desired movement, and/or actual movements of the human sports player; to receive signals from one or more cameras; to transmit indications of the observations as movement signals; and to transmit a video sequence based on the signals received from at least one of the cameras; and
a local system, proximate to a user participating in a simulation of the real sporting event, configured to receive inputs from the user; compare the inputs received from the user with received movement signals; actuate a full motion simulator based on the received movement signal; and compute based on the comparison a score to award to the user.

11. The system of claim 10 further comprising a component configured to award the computed score to the user.

12. The system of claim 11 further comprising an electronic game.

13. The system of claim 10 wherein the remote system comprises one or more microelectromechanical systems (MEMS) sensors to observe movement of the human sports player in multiple directions, wherein each MEMS sensor is configured to detect movement and/or rotation in one or more axes.

14. The system of claim 10 wherein the remote system comprises a global positioning system antenna.

15. The system of claim 10 wherein the remote system comprises a radio frequency identification unit.

16. The system of claim 10 wherein the local system comprises the full motion simulator.

17. The system of claim 10 wherein the local system comprises one or more panoramic displays.

18. The system of claim 10 wherein the local system comprises one or more audio sound recording and playback mechanisms.

19. A non-transitory computer-readable medium storing executable instructions which, if executed by a computing component, cause the computing component to perform operations comprising:
receiving from a remote device a first movement signal indicating an actual movement of a first human sports player during a real sporting event in which the first human sports player is participating;
receiving from a local control device a control signal from a user, wherein the control signal indicates input to a full motion simulator;
comparing the received first movement signal with the received control signal;
actuating the full motion simulator based on the received first movement signal;
computing based on the comparison a score to award to the user; and
awarding the computed score to the user.

20. The non-transitory computer-readable medium of claim 19, further storing executable instructions which, if executed by a computing component, cause the computing component to perform operations further comprising:
receiving an indication to provide a view in a specified direction;
transmitting an indication of the specified direction; and
receiving a video sequence wherein the video sequence is representative of a view in the specified direction in relation to the first human sports player.

21. The non-transitory computer-readable medium of claim 19, further storing executable instructions which, if executed by a computing component, cause the computing component to perform operations further comprising:
selecting a second human sports player participating in the real sporting event;
in accordance with the selecting of the second human sports player, receiving from the remote device a second movement signal indicating an actual movement of the second human sports player during the real sporting event in which the second human sports player is participating;
in accordance with receiving the second movement signal, automatically ceasing actuating the full motion simulator based on the received first movement signal; and
automatically starting:
comparing the received second movement signal with the received control signal;
actuating the full motion simulator based on the received second movement signal;
computing, based on the comparison of the received second movement signal with the received control signal, a score to award to the user; and
awarding the computed score to the user.

* * * * *

UNITED STATES PATENT AND TRADEMARK OFFICE
CERTIFICATE OF CORRECTION

| | | |
|---|---|---|
| PATENT NO. | : 9,004,998 B2 | Page 1 of 1 |
| APPLICATION NO. | : 13/696062 | |
| DATED | : April 14, 2015 | |
| INVENTOR(S) | : Coulson | |

It is certified that error appears in the above-identified patent and that said Letters Patent is hereby corrected as shown below:

In the Specification

In Column 3, Line 23, delete "players" and insert -- player's --, therefor.

In Column 6, Line 65, delete "AN ports" and insert -- A/V ports --, therefor.

In Column 7, Line 43, delete "user," and insert -- user; --, therefor.

Signed and Sealed this
Fifteenth Day of September, 2015

Michelle K. Lee
*Director of the United States Patent and Trademark Office*